United States Patent
Nakano et al.

(10) Patent No.: US 10,626,987 B2
(45) Date of Patent: Apr. 21, 2020

(54) CONTINUOUSLY VARIABLE TRANSMISSION CONTROL METHOD AND CONTINUOUSLY VARIABLE TRANSMISSION SYSTEM

(71) Applicant: NISSAN MOTOR CO., LTD., Yokohama-shi, Kanagawa (JP)

(72) Inventors: Tomoyuki Nakano, Kanagawa (JP); Hiromu Terai, Kanagawa (JP); Ryohey Toyota, Kanagawa (JP)

(73) Assignee: NISSAN MOTOR CO., LTD., Yokohama-shi, Kanagawa (JP)

( * ) Notice: Subject to any disclaimer, the term of this patent is extended or adjusted under 35 U.S.C. 154(b) by 0 days.

(21) Appl. No.: 16/336,965

(22) PCT Filed: Oct. 4, 2016

(86) PCT No.: PCT/JP2016/079544
§ 371 (c)(1),
(2) Date: Mar. 27, 2019

(87) PCT Pub. No.: WO2018/066082
PCT Pub. Date: Apr. 12, 2018

(65) Prior Publication Data
US 2019/0338852 A1    Nov. 7, 2019

(51) Int. Cl.
*F16H 61/662* (2006.01)
*F04B 17/03* (2006.01)
*F16H 9/18* (2006.01)
*F16H 57/04* (2010.01)
(Continued)

(52) U.S. Cl.
CPC .......... *F16H 61/662* (2013.01); *F04B 17/03* (2013.01); *F16H 9/18* (2013.01); *F16H 57/0446* (2013.01); *F16H 61/0031* (2013.01); *F16H 61/66* (2013.01); *F16H 2061/0037* (2013.01); *F16H 2061/66218* (2013.01)

(58) Field of Classification Search
CPC ............ F04B 17/03; F16H 2061/0037; F16H 2061/1256; F16H 2061/6604; F16H 2061/6607; F16H 2061/66204; F16H 2061/66209; F16H 2061/66218; F16H 57/0439; F16H 57/0446; F16H 61/0025; F16H 61/0031; F16H 61/12; F16H 61/16; F16H 61/66; F16H 61/662; F16H 61/66259; F16H 9/16; F16H 9/18
See application file for complete search history.

(56) References Cited

U.S. PATENT DOCUMENTS

| | | | |
|---|---|---|---|
| 2010/0035721 A1 | 2/2010 | Rothenbuhler et al. | |
| 2015/0120105 A1 | 4/2015 | Naqvi et al. | |

FOREIGN PATENT DOCUMENTS

| | | |
|---|---|---|
| CN | 104590245 A | 5/2015 |
| JP | 2006-144843 A | 6/2006 |
| JP | 2008-240894 A | 10/2008 |

*Primary Examiner* — Jacob S. Scott
(74) *Attorney, Agent, or Firm* — Faegre Drinker Biddle & Reath LLP (57) ABSTRACT

A continuously variable transmission control method for controlling entry and exit of oil in a primary pulley oil chamber by an electric oil pump disposed in an oil path between the primary pulley oil chamber and a secondary pulley oil chamber, the control method including: comparing a temperature of the electric oil pump with a first threshold; and restricting a shift amount of a continuously variable transmission when the temperature of the electric oil pump is higher than the first threshold.

5 Claims, 9 Drawing Sheets

(51) Int. Cl.
*F16H 61/00* (2006.01)
*F16H 61/66* (2006.01)

CONTINUOUSLY VARIABLE TRANSMISSION CONTROL METHOD AND CONTINUOUSLY VARIABLE TRANSMISSION SYSTEM

TECHNICAL FIELD

The invention relates to a shift control of a continuously variable transmission.

BACKGROUND ART

JP 2008-240894 A discloses a continuously variable transmission control method for controlling a speed ratio by controlling the entry and exit of oil in a primary pulley oil chamber by an electric oil pump disposed in an oil path between the primary pulley oil chamber and a secondary pulley oil chamber.

SUMMARY OF INVENTION

In the meantime, in the above configuration to control the speed ratio by the electric oil pump, when a shift is frequently performed like a case where a vehicle travels in town areas, a performance degradation of the electric oil pump may occur due to an increase in temperature in an electric motor or an inverter that drives the electric oil pump. However, this point is not considered in the above literature.

In view of this, the present invention is intended to restrain a performance degradation of an electric oil pump even in a case where a shift is repeated.

According to one embodiment of the present invention, a continuously variable transmission control method for controlling the entry and exit of oil in a primary pulley oil chamber by an electric oil pump disposed in an oil path between the primary pulley oil chamber and a secondary pulley oil chamber. In the control method, a temperature of the electric oil pump is compared with a first threshold, and when the temperature of the electric oil pump is higher than the first threshold, a shift amount of a continuously variable transmission is restricted.

DESCRIPTION OF EMBODIMENTS

With reference to the drawings and so on, the following describes embodiments of the present invention.

First Embodiment

Figure 1:
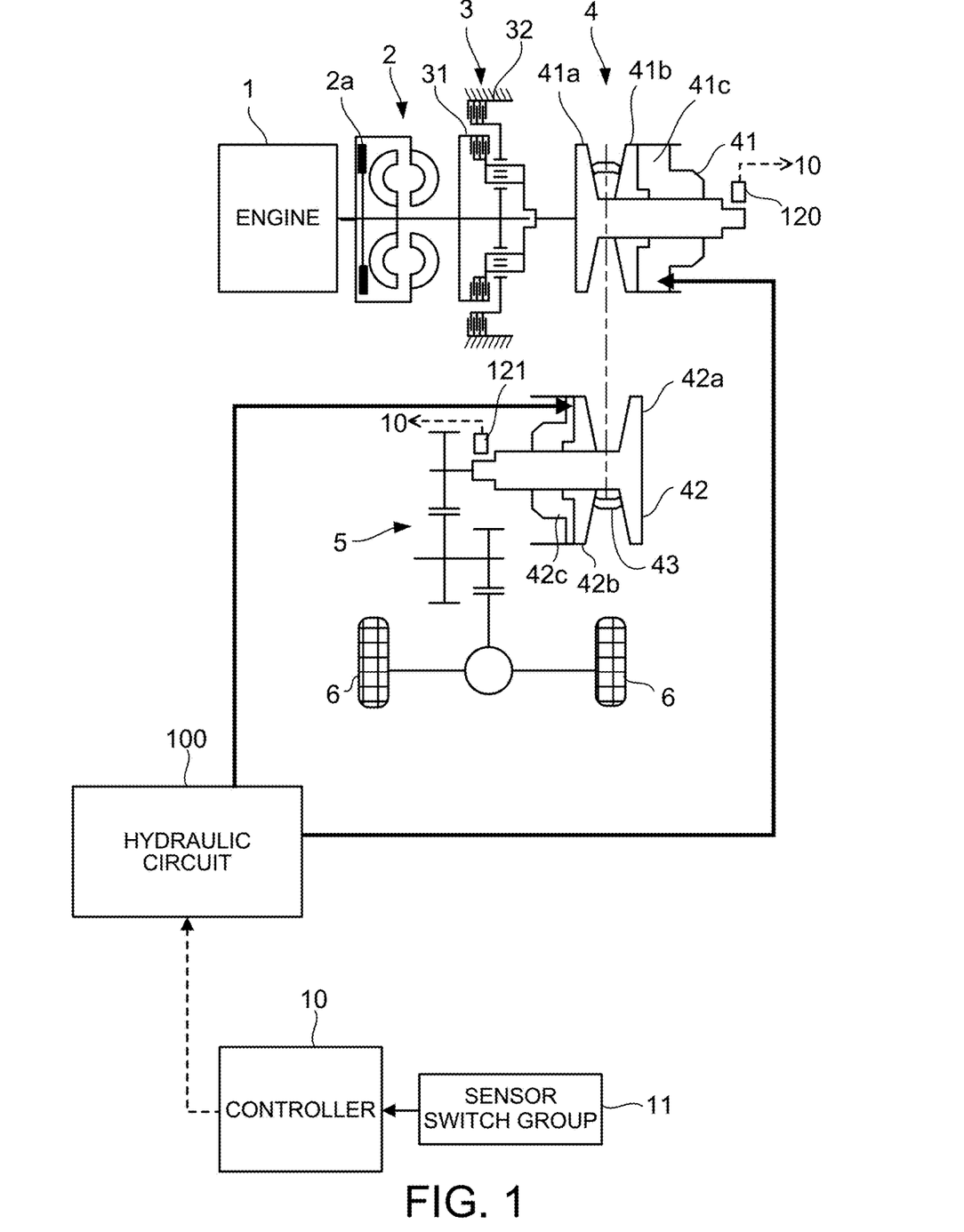
FIG. 1 is a schematic configuration diagram of a vehicle.

FIG. 1 is a schematic configuration diagram of a vehicle. The vehicle includes an engine 1, a torque converter 2 equipped with a lock-up clutch 2a, a forward/reverse switching mechanism 3, a variator 4, a final reduction mechanism 5, driving wheels 6, and a hydraulic circuit 100.

The engine 1 constitutes a drive source for the vehicle. The output of the engine 1 is transmitted to the driving wheels 6 via the torque converter 2, the forward/reverse switching mechanism 3, the variator 4, and the final reduction mechanism 5. Accordingly, the variator 4 as well as the torque converter 2, the forward/reverse switching mechanism 3, and the final reduction mechanism 5 is provided in a power transmission path via which power is transmitted from the engine 1 to the driving wheels 6.

The forward/reverse switching mechanism 3 is provided between the torque converter 2 and the variator 4 in the abovementioned power transmission path. The forward/reverse switching mechanism 3 changes a rotation direction of a rotation to be input between a forward direction corresponding to forward travel and a reverse direction corresponding to backward travel.

More specifically, the forward/reverse switching mechanism 3 includes a forward clutch 31 and a reverse brake 32. The forward clutch 31 is engaged when the rotation direction is the forward direction. The reverse brake 32 is engaged when the rotation direction is the reverse direction. Either the forward clutch 31 or the reverse brake 32 can be configured as a clutch that intermits a rotation between the engine 1 and the variator 4.

The variator 4 includes a primary pulley 41, a secondary pulley 42, and a belt 43 wound around the primary pulley 41 and the secondary pulley 42. In the following description, primary is also referred to as PRI, and secondary is also referred to as SEC. The variator 4 constitutes a belt continuously variable transmission mechanism configured to perform a shift by changing groove widths of the PRI pulley 41 and the SEC pulley 42 to change a winding diameter of the belt 43 (hereinafter just referred to as the "winding diameter").

The PRI pulley 41 includes a fixed pulley 41a and a movable pulley 41b. When a controller 10 controls an amount of oil to be supplied to a PRI pulley oil chamber 41c, the movable pulley 41b operates, so that the groove width of the PRI pulley 41 is changed.

The SEC pulley 42 includes a fixed pulley 42a and a movable pulley 42b. When the controller 10 controls an amount of oil to be supplied to an SEC pulley oil chamber 42c, the movable pulley 42b operates, so that the groove width of the SEC pulley 42 is changed.

The belt 43 is wound on a sheave surface having a V-shape formed by the fixed pulley 41a and the movable pulley 41b of the PRI pulley 41 and a sheave surface having a V-shape formed by the fixed pulley 42a and the movable pulley 42b of the SEC pulley 42.

The final reduction mechanism 5 transmits an output rotation from the variator 4 to the driving wheels 6. The final reduction mechanism 5 includes a plurality of gear trains and a differential gear. The final reduction mechanism 5 rotates the driving wheels 6 via an axle.

The hydraulic circuit 100 supplies a hydraulic pressure to the variator 4, more specifically, the PRI pulley 41 and the SEC pulley 42. The hydraulic circuit 100 also supplies a hydraulic pressure to the forward/reverse switching mechanism 3 and the lock-up clutch 2a, and also to a lubrication system and a cooling system (not shown). The hydraulic circuit 100 is more specifically configured as follows.

Figure 2:
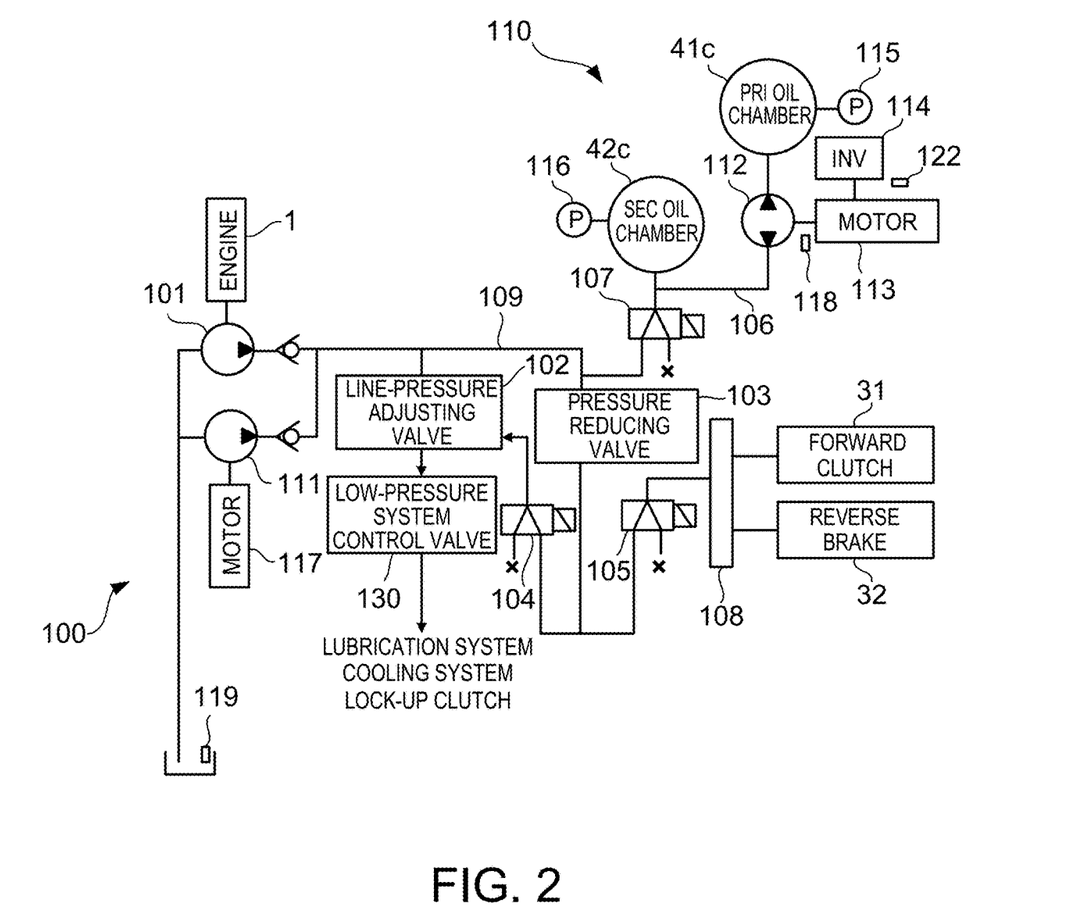
FIG. 2 is a schematic configuration diagram of a hydraulic circuit.

FIG. 2 is a schematic configuration diagram of the hydraulic circuit 100. The hydraulic circuit 100 includes a source-pressure oil pump 101, a line-pressure adjusting valve 102, a pressure reducing valve 103, a line pressure solenoid valve 104, a forward/reverse switching mechanism solenoid valve 105, a shift circuit pressure solenoid valve 107, a manual valve 108, a line-pressure oil path 109, a low-pressure system control valve 130, a shift circuit 110, and a line-pressure electric oil pump 111. In the following description, the solenoid valve is referred to as SOL.

The source-pressure oil pump 101 is a mechanical oil pump driven by power of the engine 1. The source-pressure oil pump 101 is connected to the line-pressure adjusting valve 102, the pressure reducing valve 103, the shift circuit pressure SOL 107, and the shift circuit 110 via the line-pressure oil path 109. The line-pressure oil path 109 constitutes an oil path for a line pressure. The line pressure is a hydraulic pressure as a source pressure for a PRI pressure and an SEC pressure.

The line-pressure electric oil pump 111 is driven by an electric motor 117. When the engine 1 stops due to an idling stop control and the source-pressure oil pump 101 stops along with this, for example, the line-pressure electric oil pump 111 operates to supply the line pressure.

The line-pressure adjusting valve 102 generates a line pressure by adjusting a hydraulic pressure generated by the oil pump 101. That the oil pump 101 generates a line pressure includes a case where a line pressure is generated due to such an action of the line-pressure adjusting valve 102. Oil relieved from the line-pressure adjusting valve 102 in a pressure control is supplied to the lock-up clutch 2a, the lubrication system, and the cooling system via the low-pressure system control valve 130.

The pressure reducing valve 103 reduces the line pressure. The hydraulic pressure reduced by the pressure reducing valve 103 is supplied to the line pressure SOL 104 and the forward/reverse switching mechanism SOL 105.

The line pressure SOL 104 is a linear solenoid valve and generates a controlled hydraulic pressure corresponding to a control current. The controlled hydraulic pressure generated by the line pressure SOL 104 is supplied to the line-pressure adjusting valve 102, and the line-pressure adjusting valve 102 operates in accordance with the controlled hydraulic pressure thus generated by the line pressure SOL 104 so as to perform a pressure control. On this account, a command value for a line pressure PL can be set by the control current to the line pressure SOL 104.

The forward/reverse switching mechanism SOL 105 is a linear solenoid valve and generates a hydraulic pressure corresponding to a control current. The hydraulic pressure generated by the forward/reverse switching mechanism SOL 105 is supplied to the forward clutch 31 and the reverse brake 32 via the manual valve 108 operating in response to the operation by a driver.

The shift circuit pressure SOL 107 is a linear solenoid valve and generates a hydraulic pressure to be supplied to the shift circuit 110 in accordance with a control current. On this account, a command value for a shift circuit pressure can be set by the control current to the shift circuit pressure SOL 107. The shift circuit pressure generated by the shift circuit pressure SOL 107 is supplied to a shift oil path 106. The shift circuit pressure may be generated, for example, by an SOL that generates a controlled hydraulic pressure corresponding to a control current, and a regulating valve that generates a control circuit pressure from a line pressure PL in accordance with the controlled hydraulic pressure thus generated by the SOL.

The shift circuit 110 includes the shift oil path 106 connected to the line-pressure oil path 109 via the shift circuit pressure SOL 107, and a shift oil pump 112 interposed in the shift oil path 106. The PRI pulley oil chamber 41c communicates with the SEC pulley oil chamber 42c via the shift oil path 106.

The shift oil pump 112 is an electrically-driven oil pump (electric oil pump) driven by an electric motor 113. The electric motor 113 is a so-called inverter-integrated motor controlled by the controller 10 via an inverter 114. The inverter-integrated motor includes a temperature sensor 122 for acquiring a surrounding atmospheric temperature around the inverter.

The shift oil pump 112 can change a rotation direction between a normal direction and an opposite direction. The normal direction as used herein is a direction where the oil is sent from the SEC pulley oil chamber 42c side to the PRI pulley oil chamber 41c side, and the opposite direction is a direction where the oil is sent from the PRI pulley oil chamber 41c side to the SEC pulley oil chamber 42c side.

When the shift oil pump 112 rotates in the normal direction, oil in the shift oil path 106 and the SEC pulley oil chamber 42c is supplied to the PRI pulley oil chamber 41c. Hereby, the movable pulley 41b of the PRI pulley 41 moves in a direction approaching the fixed pulley 41a, so that the groove width of the PRI pulley 41 is reduced. In the meantime, the movable pulley 42b of the SEC pulley 42 moves in a direction distanced from the fixed pulley 42a, so that the groove width of the SEC pulley 42 is increased. Note that, at the time when the shift oil pump 112 rotates in the normal direction, oil is supplied from the line-pressure oil path 109 to the shift oil path 106 so that a hydraulic pressure (hereinafter also referred to as "SEC-side hydraulic pressure") of the shift oil path 106 on the SEC pulley oil chamber 42c side (hereinafter also referred to as "SEC side") from the shift oil pump 112 does not fall below the command value for the shift circuit pressure. The command value for the shift circuit pressure is set in consideration of prevention of slip of the belt 43, and so on. Note that a hydraulic pressure of the shift oil path 106 on the PRI pulley oil chamber 41c side (hereinafter also referred to as "PRI side") from the shift oil pump 112 is also referred to as a PRI-side hydraulic pressure.

Further, when the shift oil pump 112 rotates in the opposite direction, oil flows out from the PRI pulley oil chamber 41c. Hereby, the movable pulley 41b of the PRI pulley 41 moves in a direction distanced from the fixed pulley 41a, so that the groove width of the PRI pulley 41 is increased. In the meantime, the movable pulley 42b of the SEC pulley 42 moves in a direction approaching the fixed pulley 42a, so that the groove width of the SEC pulley 42 is reduced. When the oil thus flowing out from the PRI pulley oil chamber 41c flows into the shift oil path 106, the SEC-side hydraulic pressure rises, but is controlled by the shift circuit pressure SOL 107 so that the SEC-side hydraulic pressure does not exceed the command value. That is, when the SEC-side hydraulic pressure exceeds the command value, oil is discharged from the shift oil path 106 via the shift circuit pressure SOL 107. In the meantime, when the SEC-side hydraulic pressure is less than the command value, oil flows into the shift oil path 106 from the line-pressure oil path 109 via the shift circuit pressure SOL 107.

As described above, in the continuously variable transmission of the present embodiment, a shift is performed by controlling the entry and exit of oil in the PRI pulley oil chamber 41c by the shift oil pump 112. The summary of a shift control will be described later.

Referring back to FIG. 1, the vehicle further includes the controller 10. The controller 10 is an electronic control device, and a signal from a sensor switch group 11 is input into the controller 10. Note that the controller 10 is constituted by a microcomputer including a central processing unit (CPU), a read only memory (ROM), a random access memory (RAM), and an input-output interface (I/O interface). The controller 10 can be constituted by a plurality of microcomputers.

The sensor switch group 11 includes, for example, an accelerator pedal opening sensor for detecting an accelerator pedal opening of the vehicle, a brake sensor for detecting a brake pedal force of the vehicle, a vehicle speed sensor for detecting a vehicle speed Vsp, and an engine rotation speed sensor for detecting a rotation speed NE of the engine 1.

The sensor switch group 11 further includes, for example, a PRI pressure sensor 115 for detecting a PRI pressure, an SEC pressure sensor 116 for detecting an SEC pressure, a PRI rotation speed sensor 120 for detecting an input-side rotation speed of the PRI pulley 41, an SEC rotation speed sensor 121 for detecting an output-side rotation speed of the SEC pulley 42, a pump rotation speed sensor 118 for detecting a rotation speed of the shift oil pump 112, and an oil temperature sensor 119 for detecting an oil temperature. The signal from the sensor switch group 11 may be input into the controller 10 via other controllers, for example. This also applies to a signal of information or the like generated by other controllers based on the signal from the sensor switch group 11.

The controller 10 controls the hydraulic circuit 100 based on the signal from the sensor switch group 11. More specifically, the controller 10 controls the line pressure SOL 104 and the shift circuit 110 illustrated in FIG. 2. The controller 10 is further configured to control the forward/reverse switching mechanism SOL 105 and the shift circuit pressure SOL 107.

At the time of controlling the line pressure SOL 104, the controller 10 applies, to the line pressure SOL 104, a control current corresponding to a command value for the line pressure PL.

At the time of executing a shift control, the controller 10 sets a target speed ratio based on the signal from the sensor switch group 11. When the target speed ratio is determined, the winding diameters (target winding diameters) of the pulleys 41, 42 to achieve the target speed ratio are determined. When the target winding diameters are determined, the groove widths (target groove widths) of the pulleys 41, 42 to achieve the target winding diameters are determined.

Further, in the shift circuit 110, the movable pulley 41b of the PRI pulley 41 moves in accordance with the entry and exit of oil in the PRI pulley oil chamber 41c by the shift oil pump 112, and the movable pulley 42b of the SEC pulley 42 also moves along with this. That is, a moving amount of the movable pulley 41b of the PRI pulley 41 has correlation with a moving amount of the movable pulley 42b of the SEC pulley 42.

In view of this, the controller 10 operates the shift oil pump 112 so that a position of the movable pulley 41b of the PRI pulley 41 comes to a position corresponding to the target speed ratio. Whether or not the movable pulley 41b is placed at a desired position is determined in such a manner that an actual speed ratio is calculated from detection values of the PRI rotation speed sensor 120 and the SEC rotation speed sensor 121, and it is determined whether the actual speed ratio agrees with the target speed ratio or not.

Further, the operation of the shift oil pump 112 by the controller 10 is not limited to the time when a shift is performed. Even in a case where the target speed ratio does not change, when oil leaks out from the pulley oil chambers 41c, 42c, and the actual speed ratio changes, the controller 10 operates the shift oil pump 112. In the present embodiment, such a control to maintain the target speed ratio is also included in the shift control.

That is, the shift control of the present embodiment is a feedback control to cause the position of the movable pulley 41b of the PRI pulley 41 to converge to its target position. Further, a controlled object in the feedback control is not the hydraulic pressure of each of the pulley oil chambers 41c, 42c, but the groove width of the PRI pulley 41, in other words, the position of the movable pulley 41b.

Note that a sensor for detecting the position of the movable pulley 41b may be provided to determine whether or not the movable pulley 41b is placed at a position corresponding to the target speed ratio.

In the meantime, as described above, in the transmission mechanism in which the shift oil pump 112 is driven by the electric motor 113, an amount of heat generation by the electric motor 113 is larger as a shift amount is larger. For example, the following considers a drive scene which often occurs while the vehicle travels in town areas and in which the accelerator pedal opening becomes zero once from a state where the accelerator pedal is stepped on, and then, the accelerator pedal is stepped on again. In the drive scene, the speed ratio greatly changes from a low side to a high side once and then changes to the low side again. When such a shift with a large shift amount is repeated, heat discharge from the electric motor 113 and the inverter 114 cannot cover heat generation by the electric motor 113, thereby resulting in that the temperature of the shift oil pump 112 may rise. The temperature rise in the shift oil pump 112 is a factor to cause a performance degradation of the shift oil pump 112.

Note that the "temperature of the shift oil pump 112" includes temperatures of electric system components such as the electric motor 113 and the inverter 114. The temperature of the electric motor 113 is a temperature of a motor coil, for example, and can be directly detected by a sensor or can be estimated from a current value or the like by a well-known method. The temperature of the inverter 114 includes temperatures of auxiliary parts such as a heat sink, and a temperature of a surrounding atmosphere around the inverter 114, as well as a temperature of an operation component of the inverter 114. In the following description, a surrounding atmospheric temperature (hereinafter referred to as a motor-inverter temperature Tmot_inv) to be detected by the temperature sensor 122 is taken as the temperature of the shift oil pump 112.

As a method for restraining the temperature rise in the shift oil pump 112, it is conceivable that, at the time when the temperature rises, heat generation by the electric motor 113 is restrained by restricting a shift speed. However, when the shift speed is restricted, the following problem occurs.

That is, in the above drive scene, for example, when the shift speed is restricted in a case where the speed ratio is changed from the low side to the high side, a shift command to change the speed ratio to the low side again is highly frequently generated before a target speed ratio on the high side is achieved, in comparison with a case where the shift speed is not restricted. That is, the frequency of occurrence of "shift return" in which the speed ratio is shifted to the low side during a shift to the high side increases. Note that the low side indicates a side where the speed ratio is large, and the high side indicates a side where the speed ratio is small.

In comparison with a case where a shift starts from a constant speed ratio, such a shift return has a large response delay due to the hydraulic pressure and inertia force of the pulley. On this account, a delay occurs in a response of a change of the speed ratio with respect to the increase and decrease of a driving force request from the driver, thereby resulting in that an uncomfortable feeling might be given to the driver.

In view of this, in the present embodiment, a control described below is executed even in a drive scene where a shift is repeatedly performed, in order to restrain the temperature rise in the shift oil pump 112.

Figure 3:
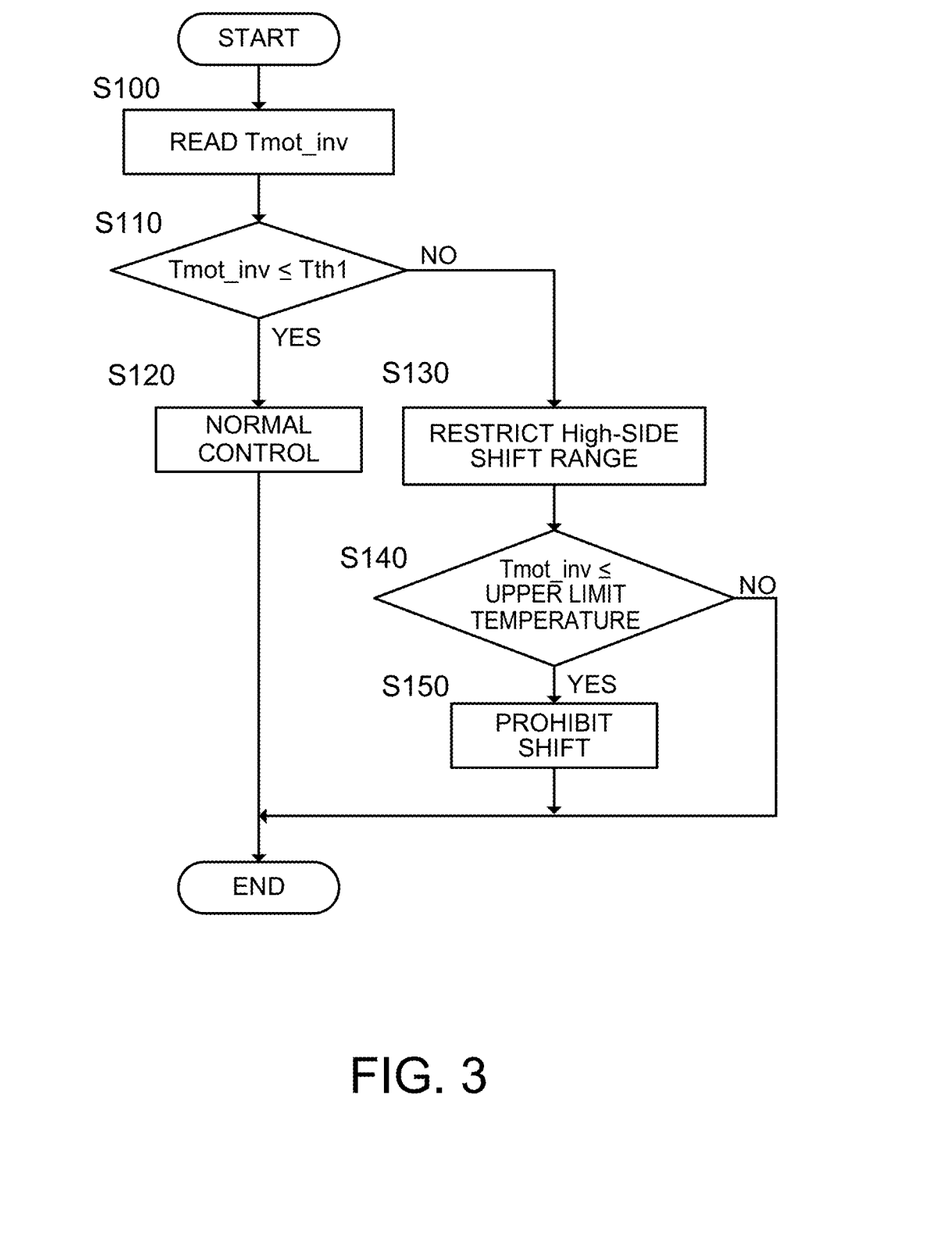
FIG. 3 is a flowchart illustrating a control routine to restrain a temperature rise in an electric oil pump according to a first embodiment.

FIG. 3 is a flowchart illustrating a control routine to be executed by the controller 10 to restrain the temperature rise in the shift oil pump 112.

In this routine, when the temperature of the shift oil pump 112 reaches a first threshold Tth1 (described later), a shift range is restricted to restrain the temperature rise after that. The following describes the routine more specifically in accordance with steps.

In step S100, the controller 10 reads a motor-inverter temperature Tmot_inv, and in step S110, the controller 10 determines whether or not the motor-inverter temperature Tmot_inv is the first threshold Tth1 (described later) or less. Then, when a determination result in step S110 is affirmative, the controller 10 executes a process of step S120, but when the determination result is negative, the controller 10 executes a process of step S130.

The first threshold Tth1 is a temperature set in advance based on an upper limit of a temperature that can guarantee shift performance. For example, a temperature lower than the first threshold by about a few degrees Celsius to around 10 degrees Celsius is taken as the first threshold to have a margin.

In step S120, the controller R501110 continues a normal control. The normal control as used herein indicates a control to shift between the highest speed ratio and the lowest speed ratio without restricting the shift range (described later) or restricting the shift speed.

In step S130, the controller 10 restricts a shift amount of the transmission mechanism. More specifically, some shift ranges including the highest speed ratio that can be mechanistically taken are assumed a restriction range, and a shift to the restriction range is prohibited. In other words, a lower limit of the speed ratio is set to a value larger than a minimum speed ratio that can be mechanistically taken by the transmission. Details of the restriction range will be described later.

In step S140, the controller 10 determines whether or not the motor-inverter temperature Tmot_inv is at least an upper limit temperature up to which thermal durability of the electric system components can be secured. When a determination result is affirmative, the controller 10 prohibits a shift in step S150, but when the determination result is negative, the controller 10 ends the routine.

Figure 4:
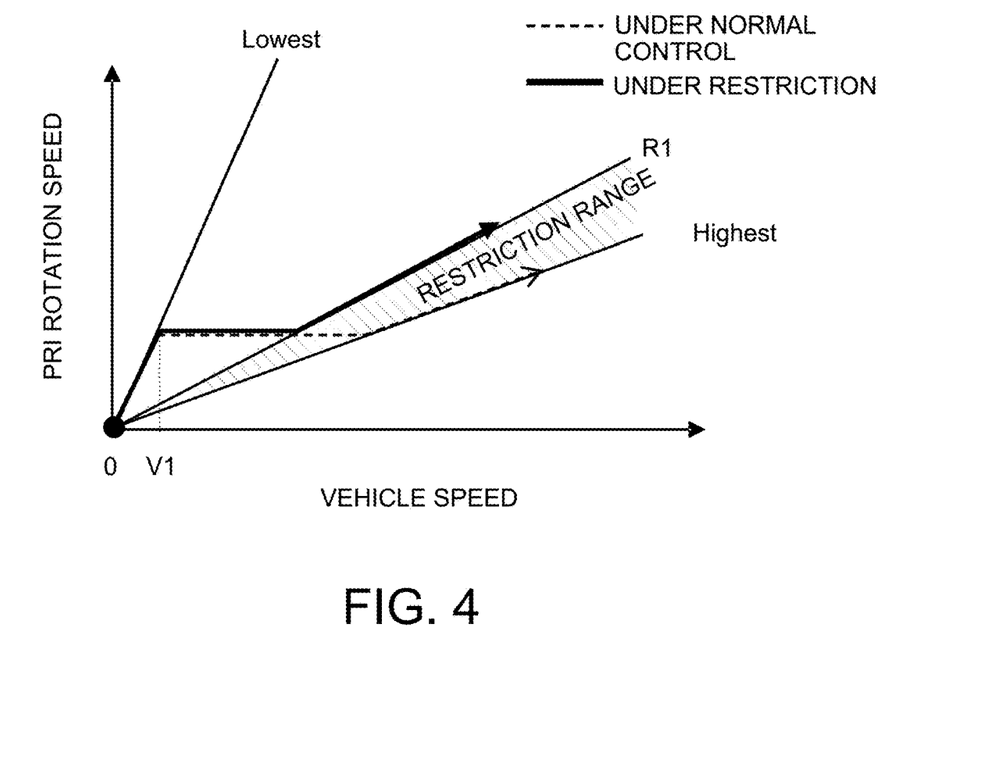
FIG. 4 is a view illustrating an example of a shift history when the control routine of FIG. 3 is executed.

FIG. 4 is a view illustrating an example of a shift history when the vehicle starts traveling from a stop state (vehicle speed=zero) and continues acceleration. In FIG. 4, the horizontal axis indicates vehicle speed, and the vertical axis indicates PRI rotation speed. In the figure, a shift history obtained when the normal control is executed is indicated by a broken line.

The speed ratio is the lowest speed ratio until the vehicle speed reaches V1 after the vehicle starts traveling, and when the vehicle speed reaches V1, the speed ratio changes to the high side so that the vehicle speed rises with the PRI rotation speed being maintained to be constant. At this time, in the normal control, the speed ratio changes to the highest speed ratio. However, in a case where the shift amount is restricted in step S130, the speed ratio changes only to R1 as indicated by an actual arrow in the figure. As a result, after the speed ratio has reached R1, the PRI rotation speed is higher in the case where the speed ratio is restricted than in the case where the normal control is executed, when they are compared at the same vehicle speed. That is, the engine rotation speed increases.

Figure 5:
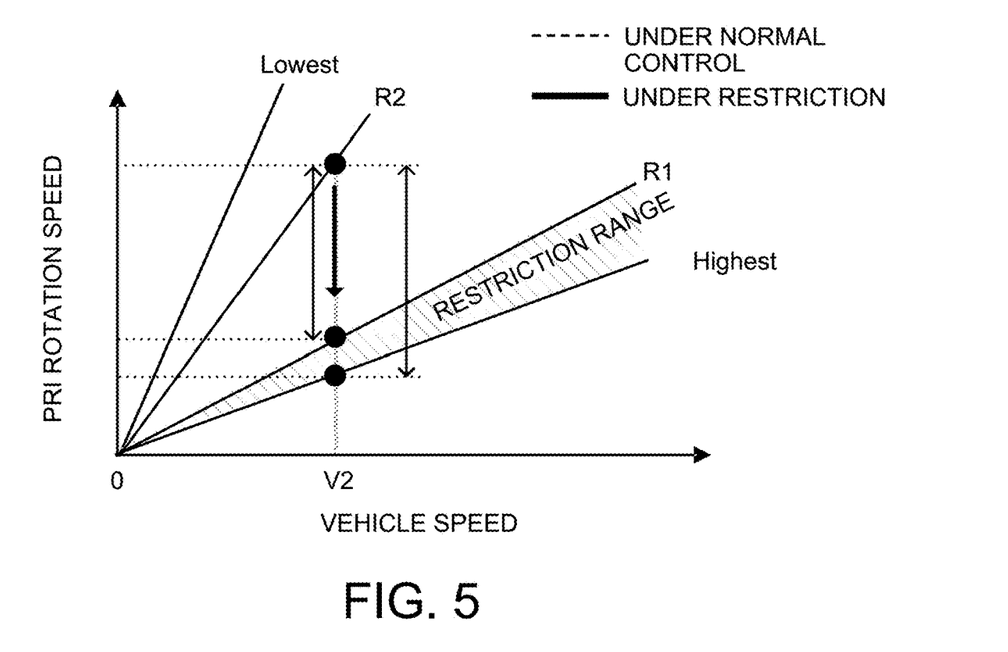
FIG. 5 is a view illustrating another example of the shift history when the control routine of FIG. 3 is executed.

FIG. 5 is a view illustrating a shift history in a case where the driver releases the accelerator pedal while the vehicle travels in a state where the vehicle speed is V2 and the speed ratio is R2. In FIG. 5, the horizontal axis indicates vehicle speed, and the vertical axis indicates PRI rotation speed.

Since the driver releases the accelerator pedal, the speed ratio changes to the high side. At this time, in the normal control, the speed ratio changes to the highest speed ratio. However, in a case where the shift amount is restricted, the speed ratio changes only to R1 as indicated by an actual arrow in the figure. In other words, the moving amount of the PRI pulley 41 becomes small in the case where the shift amount is restricted, in comparison with the case where the normal control is executed. Since the moving amount of the PRI pulley 41 becomes small, the work load of the electric motor 113 decreases by just that much. That is, by restricting the shift amount, the amount of heat generation by the electric motor 113 decreases as compared with the case where the normal control is executed. Hereby, the temperature rise in the shift oil pump 112 is restrained.

Figure 6:
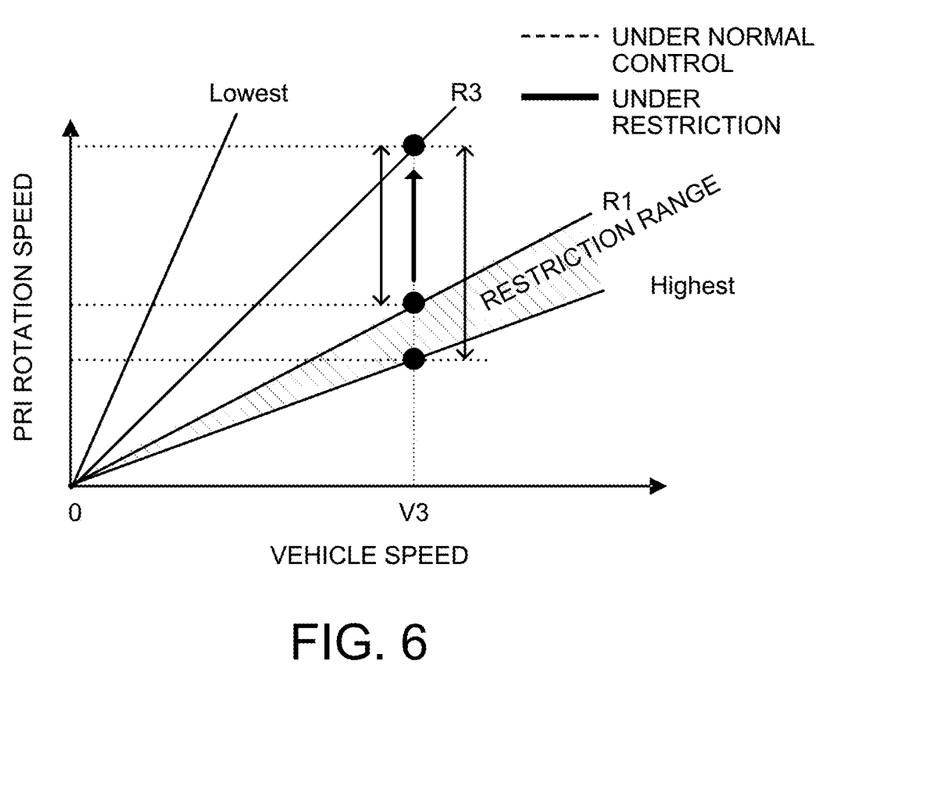
FIG. 6 is a view illustrating further another example of the shift history when the control routine of FIG. 3 is executed.

FIG. 6 is a view illustrating a shift history obtained when the speed ratio is changed to R3 by performing kickdown while the vehicle travels in a state where the vehicle speed is V3. In FIG. 6, the horizontal axis indicates vehicle speed, and the vertical axis indicates PRI rotation speed.

In the state where the vehicle speed is V3, the speed ratio is the highest speed ratio in the normal control, whereas the speed ratio is R1 in the case where the shift amount is restricted. On this account, similarly to the case of FIG. 4, the moving amount of the PRI pulley 41 is smaller in the case where the shift amount is restricted than in the case where the normal control is executed. As a result, by restricting the shift amount, the amount of heat generation by the electric motor 113 decreases as compared with the case where the normal control is executed. Hereby, the temperature rise in the shift oil pump 112 is restrained.

Figure 7:
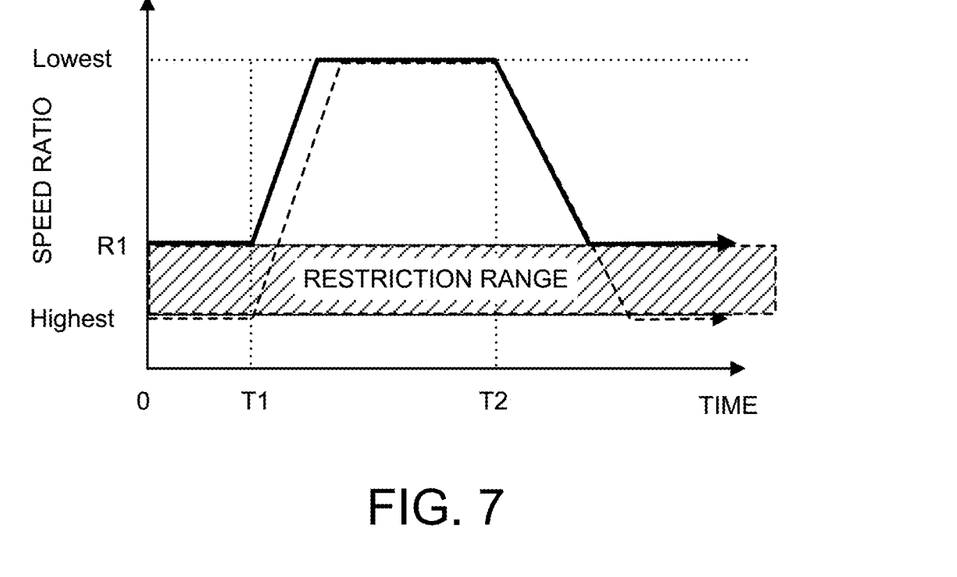
FIG. 7 is a timing chart illustrating hourly variations of a speed ratio when the control routine of FIG. 3 is executed.

FIG. 7 is a timing chart illustrating changes of the speed ratio in the case where the restriction of the shift amount is executed. FIG. 7 illustrates a pattern in which a shift toward the low side is started at timing T1 during travel at a constant vehicle speed, and a shift toward the high side is started at timing T2 that comes after the speed ratio reaches the lowest speed ratio. For comparison, the case where the normal control is executed is indicated by a broken line in the figure. Note that, at the time of execution of the normal control, the speed ratio during travel at the constant vehicle speed before timing T1 is the highest speed ratio.

At timing T1, a control to change the speed ratio to the lowest speed ratio is started, for example, in response to stepping on the accelerator pedal. In this case, the change amount of the speed ratio before the speed ratio reaches the lowest speed ratio is smaller in the case where the shift amount is restricted than in the case where the normal control is executed, similarly to the description about FIG. 6. In the meantime, at timing T2, a control to change the speed ratio to the high side is started, for example, in response to releasing the accelerator pedal. In this case, in the normal control, the speed ratio changes to the highest speed ratio. However, in the case where the shift amount is restricted, the speed ratio changes only to R1. Accordingly, the change amount of the speed ratio is smaller in the case where the shift amount is restricted than in the case where the normal control is executed, similarly to the description about FIG. 5.

For example, in a case where a vehicle stop at a traffic light and a vehicle start are repeated like a case where the vehicle travels in city areas, the shift illustrated in FIG. 7 is repeated. On this account, the restraint of the amount of heat generation by the electric motor 113 due to restriction of the shift amount is effective to restrain the temperature rise in the shift oil pump 112.

Figure 8:
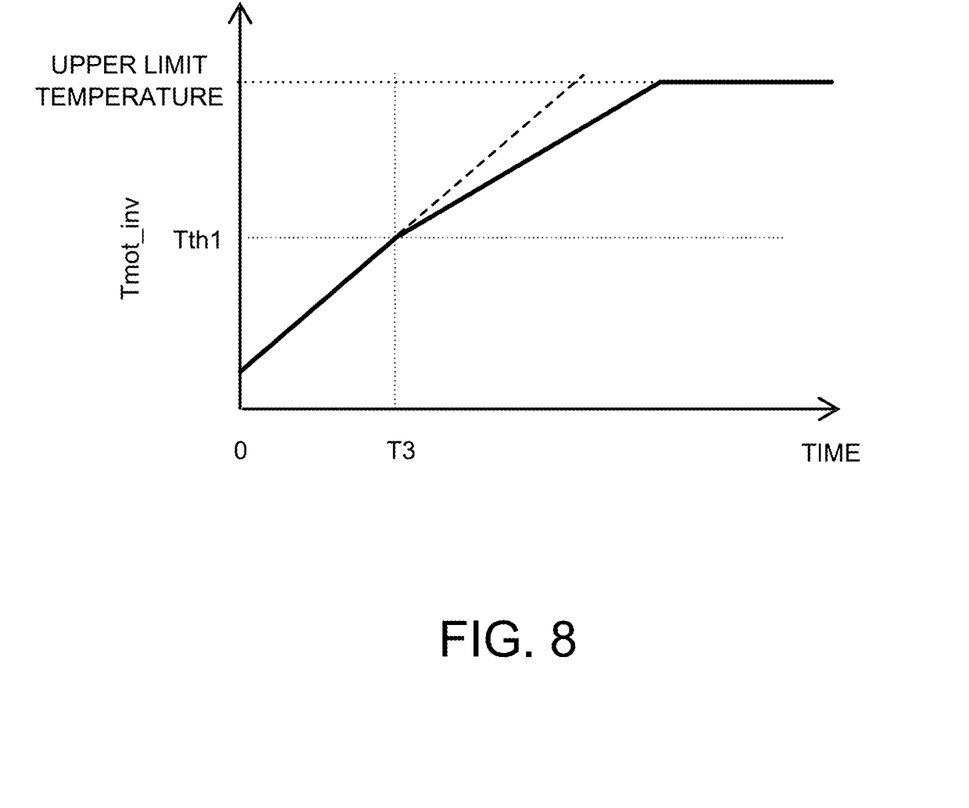
FIG. 8 is a timing chart illustrating hourly variations of the temperature of the electric oil pump when the control routine of FIG. 3 is executed.

FIG. 8 is a timing chart illustrating a history of the motor-inverter temperature Tmot_inv in the case where the restriction of the shift amount is executed. A broken line in the figure indicates a shift history obtained in the case where the normal control is executed.

At the point when the vehicle starts traveling at timing 0, the motor-inverter temperature Tmot_inv is lower than the first threshold Tth1. Accordingly, the controller 10 executes the normal control. When the motor-inverter temperature Tmot_inv reaches the first threshold Tth1 at timing T3 by repeating a shift during travel, the controller 10 starts to restrict the shift amount. When the motor-inverter temperature Tmot_inv reaches the upper limit temperature up to which the thermal durability of the electric system components can be secured, the controller 10 prohibits a shift.

As described above, the amount of heat generation by the electric motor 113 is restrained by restricting the shift amount, so that the rising speed of the motor-inverter temperature Tmot_inv is slower than that in the case where in the normal control is executed. That is, by restraining the shift amount, it is possible to restrain the temperature rise in the shift oil pump 112.

Note that, even in a case where the speed ratio on the low side is restricted to a value smaller than the lowest speed ratio reversely to the above description, the work load by the electric motor 113 decreases, so that it is possible to restrain the temperature rise in the shift oil pump 112.

Next will be described the restriction range.

The restriction range is set to a range of about 10% of the shift amount from the highest speed ratio that can be mechanistically taken to the lowest speed ratio. For example, in FIG. 7, a range from Highest to R1 is set to about 10% of a range from Highest to Lowest.

As described above, in either a case where the shift amount on the high side is restricted or a case where the shift amount on the low side is restricted, it is possible to obtain the effect of restraining the temperature rise in the shift oil pump 112. However, when the shift amount on the high side is restricted, it is possible to obtain such an effect that the driver does not have an uncomfortable feeling caused due to the restriction of the shift amount. That is, a shift to the low side (also referred to as a down-shift) is performed in response to an acceleration request or in preparation for re-acceleration, and if the lowest speed ratio side has a restriction range at this time, the driver cannot have a desired acceleration feeling, so the driver easily feels uncomfortable. In this regard, a shift to the high side (also referred to as an up-shift) is performed when the driver releases the accelerator pedal or while the vehicle speed is rising. If the shift amount to the high side is restricted in such a case, the engine rotation speed becomes higher than that in the normal control as described above. However, if the restriction range is around 10% as described above, the increased amount of the engine rotation speed is around 100 to 200 rotations, and therefore, the driver can hardly feel uncomfortable.

As described above, in the present embodiment, the controller 10 compares the motor-inverter temperature Tmot_inv with the first threshold Tth1, and when the motor-inverter temperature Tmot_inv is higher than the first threshold Tth1, the controller 10 restricts the shift amount of the continuously variable transmission. Hereby, the rise of the motor-inverter temperature Tmot_inv can be restrained. In other words, it is possible to protect the shift oil pump (electric oil pump) 112 from deterioration due to a temperature rise.

Further, in the present embodiment, the lower limit of the speed ratio is set to a speed ratio larger than the minimum speed ratio that can be mechanistically taken by the continuously variable transmission, so that the shift amount of the continuously variable transmission is restricted. Hereby, while an uncomfortable feeling to be given to the driver is reduced, the rise of the motor-inverter temperature Tmot_inv can be restrained.

Second Embodiment

The second embodiment is the same as the first embodiment in that the shift amount is restricted when the motor-inverter temperature Tmot_inv reaches the first threshold Tth1, but the second embodiment is different from the first embodiment in a control after the motor-inverter temperature Tmot_inv exceeds the first threshold Tth1. The following mainly describes differences.

Figure 9:
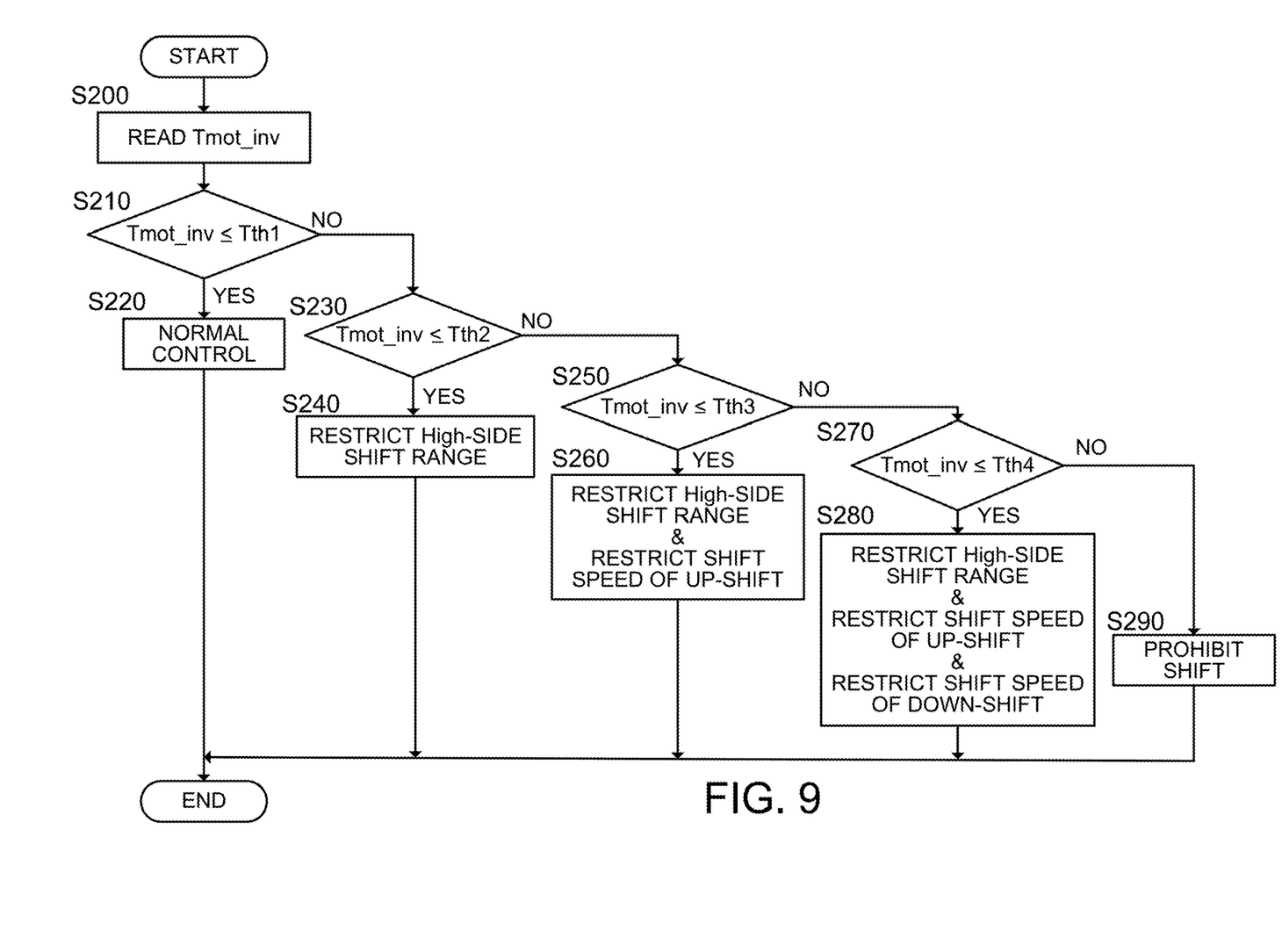
FIG. 9 is a flowchart illustrating a control routine to restrain a temperature rise in an electric oil pump according to a second embodiment.

FIG. 9 is a flowchart illustrating a control routine to be executed by the controller 10 in the second embodiment to restrain the temperature rise in the shift oil pump 112.

Steps S200 to S220 are the same as S100 to S120 in FIG. 3, so the description about S200 to S220 is omitted.

When a determination result in step S210 is negative, the controller 10 executes a process of step S230.

In step S230, the controller 10 determines whether or not the motor-inverter temperature Tmot_inv is a second threshold Tth2 or less. When a determination result is affirmative, the controller 10 executes a process of restricting the shift range on the high side in step S240, similarly to the process of step S130 in FIG. 3. In the meantime, when the determination result is negative, the controller 10 executes a process of step S250.

The second threshold Tth2 to be used in the determination of step S230 is a temperature higher than the first threshold Tth1 but lower than a fourth threshold that is the upper limit temperature up to which the thermal durability of the electric system components can be secured.

In step S250, the controller 10 determines whether or not the motor-inverter temperature Tmot_inv is a third threshold Tth3 or less. When a determination result is affirmative, the controller 10 executes a process of step S260, but when the determination result is negative, the controller 10 executes a process of step S270. The third threshold Tth3 to be used in the determination of step S250 is higher than the second threshold Tth2 but lower than the fourth threshold.

In step S260, in addition to restriction of the shift amount to the high side, the controller 10 also restricts a shift speed of an up-shift to be lower than a shift speed at the time of execution of the normal control. The restricted shift speed of the up-shift is set, for example, to a shift speed lower by 10% to 20% than the shift speed of the up-shift in the normal control.

Note that the shift speed in the normal control is set by a well-known technique to set the shift speed based on the accelerator pedal opening and the vehicle speed.

Figure 10:
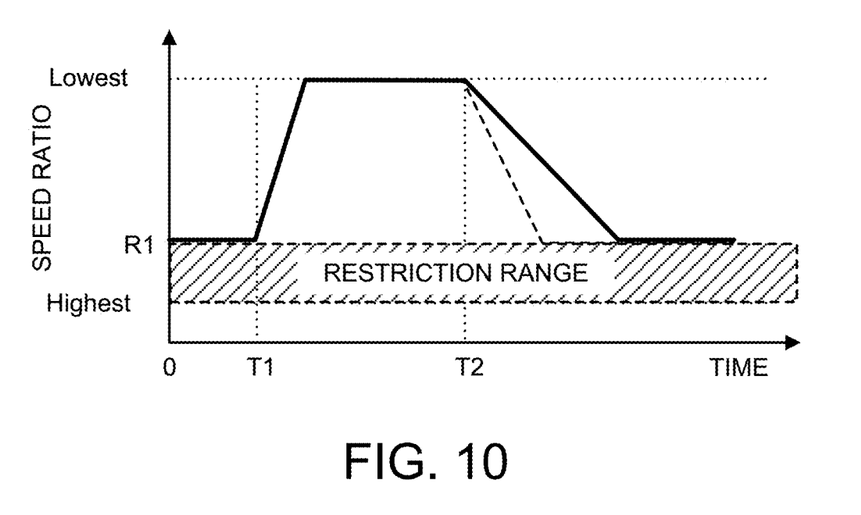
FIG. 10 is a timing chart illustrating one example of hourly variations of a speed ratio when the control routine of FIG. 9 is executed.

FIG. 10 is a timing chart obtained when the restriction of the shift amount to the high side, similar to that of the first embodiment, and the restriction of the shift speed of the up-shift are performed. As compared to FIG. 7, since the shift speed of the up-shift is restricted, it takes a long time after the up-shift is started at timing T2 but before the speed ratio reaches R1. That is, when the shift speed is restricted, the work load of the electric motor 113 does not change, but its work rate decreases. This makes it possible to restrain heat generation by the electric motor 113.

Further, the reason why the shift speed of the up-shift is restricted is to prevent the driver from having an uncomfortable feeling. That is, as described above, a down-shift is performed in response to an acceleration request and the like, and therefore, when the shift speed decreases, the driver cannot have a desired acceleration feeling, so the driver easily feels uncomfortable, but even if the shift speed of the up-shift is decreased, a decrease in the engine rotation speed is just delayed, and the driver can hardly feel uncomfortable.

In step S270, the controller 10 determines whether or not the motor-inverter temperature Tmot_inv is the fourth threshold Tth4 or less. When a determination result is affirmative, the controller 10 executes a process of step S280, but when the determination result is negative, the controller 10 executes a process of step S290.

In step S280, in addition to the restriction of the shift amount to the high side and the restriction of the shift speed of the up-shift that are similar to those in step S260, the controller 10 further executes restriction of the shift speed of the down-shift. The restricted shift speed of the down-shift is set, for example, to a shift speed lower by 10% to 20% than a shift speed of a down-shift in the normal control.

Figure 11:
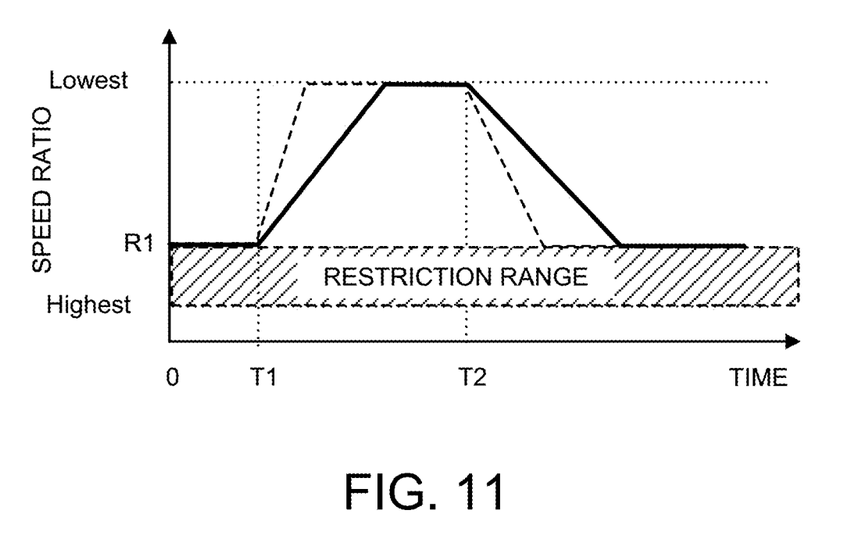
FIG. 11 is a timing chart illustrating another example of hourly variations of the speed ratio when the control routine of FIG. 9 is executed.

FIG. 11 is a timing chart obtained when the restriction of the shift amount to the high side and the restriction of the shift speeds of the up-shift and the down-shift are performed. As compared to FIG. 10, since the shift speed of the down-shift is restricted, it takes a long time until the speed ratio reaches the lowest speed ratio from R1. That is, the process of step S280 can restrain heat generation by the electric motor 113 more than the process of step S260.

Note that, when the shift speed of the down-shift is restricted, the driver may have an uncomfortable feeling, but the protection of the electric system components such as the electric motor 113 and the inverter 114 is prioritized herein. Further, the restriction of the shift speeds of the up-shift and the down-shift is a factor to increase the occurrence frequency of "shift return" as described above. However, in the present embodiment, the shift amount is restricted, so that it is possible to moderate the increase in the occurrence frequency of "shift return."

In step S290, the controller 10 prohibits a shift. Hereby, the electric motor 113 does not operate, so that heat generation due to the operation does not occur.

Note that the second threshold Tth2 and the third threshold Tth3 are set appropriately within a temperature range between the first threshold Tth1 and the fourth threshold Tth4. For example, the first threshold Tth1, the second threshold Tth2, the third threshold Tth3, and the fourth threshold Tth4 are set generally at regular intervals.

Figure 12:
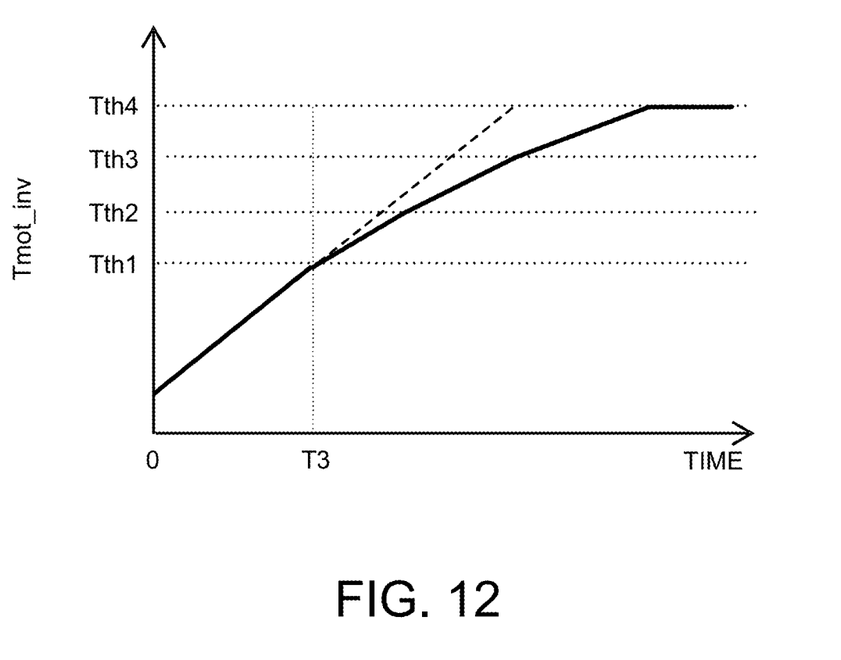
FIG. 12 is a timing chart illustrating hourly variations of the temperature of the electric oil pump when the control routine of FIG. 9 is executed.

FIG. 12 is a timing chart illustrating a history of the motor-inverter temperature Tmot_inv in a case where the control of the present embodiment is executed. A broken line in the figure indicates a shift history obtained in the case where the normal control is executed.

Since the controller 10 restricts the shift amount when the motor-inverter temperature Tmot_inv rises to the first threshold Tth1, the rising speed of the motor-inverter temperature Tmot_inv decreases as illustrated in FIG. 12. As the motor-inverter temperature Tmot_inv rises to the second threshold Tth2 and then to the third threshold Tth3, the controller 10 executes restriction of the shift speed of the up-shift, and then, restriction of the shift speed of the down-shift. Hereby, in comparison with a case where only the restriction of the shift amount is performed, the rise of the motor-inverter temperature Tmot_inv can be more surely restrained.

As described above, in the present embodiment, it is possible to obtain the same effect as the first embodiment. Further, in the present embodiment, in a case where the motor-inverter temperature Tmot_inv is higher than the second threshold that is higher than the first threshold, the shift speed is also restricted in addition to the restriction of the shift amount, so that the rise of the motor-inverter temperature Tmot_inv can be more surely restrained.

Further, in the present embodiment, the restriction of the shift speed is performed such that, in a case where the motor-inverter temperature Tmot_inv is not higher than the third threshold that is higher than the second threshold, only the shift speed at the time of decreasing the speed ratio is restricted, and in a case where the motor-inverter temperature Tmot_inv is higher than the third threshold, the shift speed at the time of decreasing the speed ratio and the shift speed at the time of increasing the speed ratio are both restricted. In a case of a shift in which the speed ratio is decreased, that is, in a case of an up-shift, even if the shift speed is restricted, the driver can hardly feel uncomfortable. On the other hand, in a case of a shift in which the speed ratio is increased, that is, in a case of a down-shift, when the shift speed is restricted, the driver easily has an uncomfortable feeling such as insufficiency in accelerating power. In the meantime, the effect of restraining the rise of the motor-inverter temperature Tmot_inv is larger in the case where the shift speeds of the up-shift and the down-shift are both restricted than in the case where either one of them is restricted. Accordingly, with the present embodiment, it is possible to restrain an uncomfortable feeling to be given to the driver, and it is possible to protect the shift oil pump 112 from deterioration due to a temperature rise.

The embodiments of the present invention have been described above, but the embodiments just exemplify some applications of the present invention and are not intended to limit the technical scope of the present invention to the concrete configurations of the embodiments.

The invention claimed is:

1. A continuously variable transmission control method for controlling entry and exit of oil in a primary pulley oil chamber by an electric oil pump disposed in an oil path between the primary pulley oil chamber and a secondary pulley oil chamber, the control method comprising:

comparing a temperature of the electric oil pump with a first threshold; and restricting a shift amount of a continuously variable transmission when the temperature of the electric oil pump is higher than the first threshold.

2. The continuously variable transmission control method according to claim 1, wherein the shift amount of the continuously variable transmission is restricted by setting a lower limit of a speed ratio to a speed ratio larger than a minimum speed ratio to be mechanistically taken by the continuously variable transmission.

3. The continuously variable transmission control method according to claim 1, wherein, in a case where the temperature of the electric oil pump is higher than a second threshold that is higher than the first threshold, a shift speed is also restricted in addition to the restriction of the shift amount.

4. The continuously variable transmission control method according to claim 3, wherein the restriction of the shift speed is performed such that:

in a case where the temperature of the electric oil pump is not higher than a third threshold that is higher than the second threshold, only a shift speed when the speed ratio is decreased is restricted; and in a case where the temperature of the electric oil pump is higher than the third threshold, the shift speed when the speed ratio is decreased and a shift speed when the speed ratio is increased are both restricted.

5. A continuously variable transmission system comprising:

an electric oil pump disposed in an oil path between a primary pulley oil chamber and a secondary pulley oil chamber;

a controlling portion configured to drive the electric oil pump to control entry and exit of oil in the primary pulley oil chamber; and a temperature acquisition portion configured to acquire a temperature of the electric oil pump, wherein, when the temperature of the electric oil pump is higher than a first threshold, the controlling portion restricts a shift amount of a continuously variable transmission.

* * * * *